United States Patent
Duggirala et al.

(10) Patent No.: US 8,317,974 B2
(45) Date of Patent: *Nov. 27, 2012

(54) DEINKING A CELLULOSIC SUBSTRATE USING MAGNESIUM HYDROXIDE

(75) Inventors: Prasad Y. Duggirala, Naperville, IL (US); Michael J. Murcia, DeKalb, IL (US)

(73) Assignee: Nalco Company, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/366,644

(22) Filed: Feb. 6, 2012

(65) Prior Publication Data

US 2012/0135908 A1 May 31, 2012

Related U.S. Application Data

(63) Continuation of application No. 12/169,900, filed on Jul. 9, 2008, now Pat. No. 8,133,351.

(51) Int. Cl.
*D21C 5/02* (2006.01)
(52) U.S. Cl. ................................ 162/8; 162/4; 162/5
(58) Field of Classification Search ............... 162/4–8
See application file for complete search history.

(56) References Cited

U.S. PATENT DOCUMENTS 8,133,351 B2 * 3/2012 Duggirala et al. ............. 162/8

* cited by examiner

*Primary Examiner* — Anthony Calandra
(74) *Attorney, Agent, or Firm* — Calfee, Halter & Griswold LLP

(57) ABSTRACT

A composition and method for deinking is disclosed. The composition and method contain an activated magnesium hydroxide or a magnesium hydroxide.

3 Claims, 2 Drawing Sheets

DEINKING A CELLULOSIC SUBSTRATE USING MAGNESIUM HYDROXIDE

This application is a continuation application of U.S. patent application Ser. No. 12/169,900, filed Jul. 9, 2008, now U.S. Pat. No. 8,133,351.

FIELD OF THE INVENTION

The invention pertains to compositions and methods for deinking a cellulosic substrate.

BACKGROUND OF THE INVENTION

Efficiently removing ink from secondary fiber without impacting fiber quality is one of the major challenges in paper recycling. Currently, the most widespread method of removing ink from secondary fiber is an alkaline process that uses sodium hydroxide, sodium silicate, hydrogen peroxide, surfactants and chelants. The caustic is used to elevate the pH in the repulper causing the fiber to swell, which assists in ink detachment, but also yellows the fiber due to interaction with lignin in mechanical grades, resulting in a brightness loss. Peroxide is added to reduce fiber yellowing, and chelant is added to prevent peroxide degradation by metals. Surfactants are used to manage the detached ink and prevent redeposition onto the fiber.

While the conventional method of deinking is effective for ink removal, it has disadvantages. When the cost of the chemicals needed to overcome the unwanted effects of caustic is considered, the alkaline method is quite expensive. Aside from the high cost of the chemicals used, handling caustic can be hazardous, and it is critical to maintain the proper balance of caustic, peroxide and silicate to produce fiber with the desired optical properties. Moreover, any residual fiber yellowing, or chromophoric generation, that is caused by caustic and cannot be removed with bleaching is balanced blue dye to the fiber. While this is effective for achieving a neutral color balance, it reduces ISO brightness, making it difficult to reach brightness targets. In addition, a recent study showed that fiber strength and tensile index was reduced for secondary fiber deinked under alkaline conditions. Finally, the elevated pH in the pulper saponifies adhesives, thereby introducing more stickies into the papermaking system, which cause runnability problems for the paper machine.

An improved methodology is therefore desired.

SUMMARY OF THE INVENTION

The present invention provides for a composition comprising: (a) activated magnesium hydroxide; (b) optionally a suspending agent for said activated magnesium hydroxide; (c) water; (d) optionally an emulsifier; (e) optionally excluding caustic soda; and (f) optionally excluding hydrogen peroxide.

The present invention also provides for a composition comprising: (a) magnesium hydroxide; (b) a suspending agent for said magnesium hydroxide; (c) water; (d) optionally an emulsifier; (e) optionally excluding caustic soda; and (f) optionally excluding hydrogen peroxide.

The present invention also provides for a method of removing ink from a cellulosic containing substance comprising: (a) adding to the substance a composition comprising: (1) activated magnesium hydroxide, (2) water, (3) optionally a suspending agent for said activated magnesium hydroxide, and (4) optionally an emulsifier; (b) optionally excluding adding caustic soda to the cellulosic containing substance; and (c) optionally excluding adding hydrogen peroxide to the cellulosic containing substance.

The present invention further provides for a method of removing ink from a cellulosic containing substance comprising: (a) adding to the substance a composition comprising: (1) magnesium hydroxide, (2) a suspending agent for said magnesium hydroxide, (3) water, and (4) optionally an emulsifier; (b) optionally excluding adding caustic soda to the cellulosic containing substance; and (c) optionally excluding adding hydrogen peroxide to the cellulosic containing substance.

DETAILED DESCRIPTION OF THE INVENTION

A. Definitions

Figure 1:
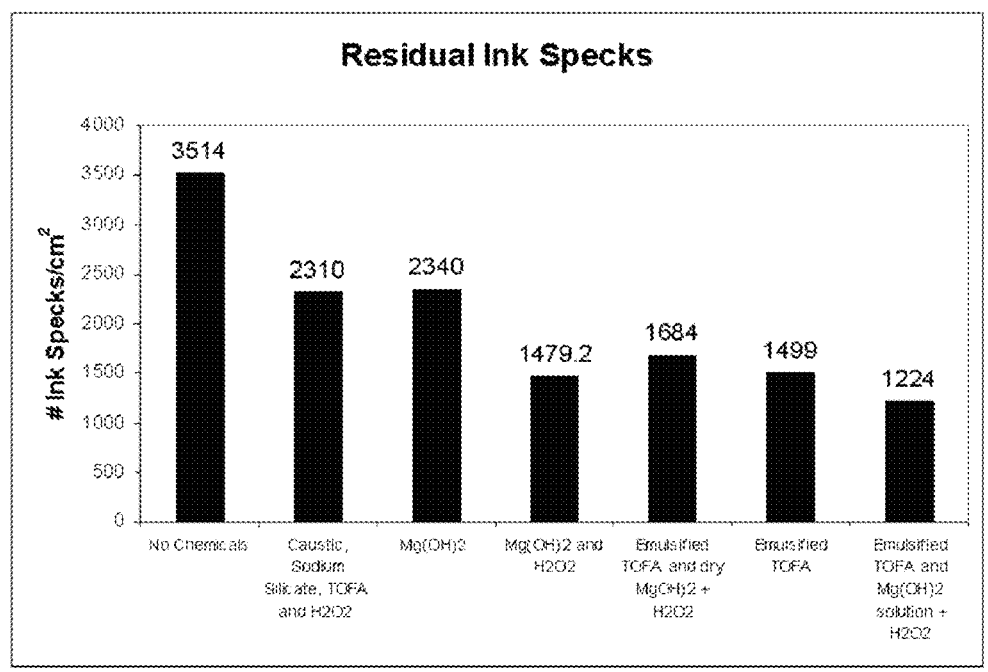
FIG. 1 shows residual ink data after the application of an activated magnesium hydroxide and emulsified TOFA formulation to fiber.

"Suspending agent" means one or more agents that prevents precipitation of a stabilized dispersion of colloidal particles in solution.

"Activated magnesium hydroxide" means a formulation that includes magnesium hydroxide plus one or more components that provides additional deinking performance over the magnesium hydroxide alone, e.g. oil added as formulation with magnesium hydroxide. For example, if the magnesium hydroxide is mixed with an oil and that oil meets the requirements of providing additional deinking performance, then the magnesium hydroxide is an activated magnesium hydroxide.

"Recycling process" means any process that involves the handling of secondary fibers.

"TOFA" means tall oil fatty acid.

"%" means percent by weight of the composition.

B. Compositions

As stated above, the present invention provides for a composition comprising: (a) activated magnesium hydroxide; (b) optionally a suspending agent for said activated magnesium hydroxide; (c) water; (d) optionally an emulsifier; (e) optionally excluding adding caustic soda; and (f) optionally excluding hydrogen peroxide. The present invention also provides for a composition comprising: (a) magnesium hydroxide; (b) a suspending agent for said magnesium hydroxide; (c) water; (d) optionally an emulsifier; (e) optionally excluding caustic soda; and (f) optionally excluding hydrogen peroxide.

In one embodiment, the suspending agent is a thickening agent.

In another embodiment, the thickening agent is selected from the group consisting of: galactomannans; guar gum; locust bean gum; xanthan gum; para gum; cellulosics; hydroxypropyl methylcellulose; hydroxypropyl cellulose; carrageean; alginates; sodium alginates; potassium alginates, ammonium salt alginates; and a combination thereof.

In another embodiment, the composition contains from about 5% to about 70% of said activated magnesium hydroxide/magnesium hydroxide, based upon weight of the composition.

In another embodiment, the composition contains about 47% of said activated magnesium hydroxide/magnesium hydroxide, based upon weight of the composition.

In another embodiment, the composition contains from about 0.05% to about 20% of said suspending agent, based upon weight of the composition.

In another embodiment, the composition contains about 0.4% of said suspending agent, based upon weight of the composition.

In another embodiment, the composition comprises an oil.

In another embodiment, the composition contains from about 2% to about 55% of said oil based upon the weight of the composition.

In another embodiment, the composition contains about 30% of said oil based upon the weight of the composition.

In another embodiment, the oil contains a fatty acid.

In another embodiment, the oil is used to form an oil and water emulsion.

In another embodiment, the composition contains from about 0.5% to about 20% of said emulsifier.

In another embodiment, the composition contains about 3% of said emulsifier.

In another embodiment, the emulsifier is a surfactant.

In another embodiment, the fatty acid contains a tall oil fatty acid.

In another embodiment, the emulsifier is selected from the group consisting of: sorbitol derivatives; polysorbate 80; sorbitan monolaurate; polysorbate 20; ethoxylated alcohols; sodium laureth sulfate; polyethylene glycol; sulfate esters; sodium lauryl sulfate; and a combination thereof.

In another embodiment, the composition comprises: (a) activated magnesium hydroxide/magnesium hydroxide; (b) xanthan gum; (c) tall oil fatty acid; (d) sodium lauryl sulfate; and (e) water.

In a further embodiment, the composition is comprised of about 47% of said activated magnesium hydroxide/magnesium hydroxide; about 0.395% xanthan gum; about 30% tall oil fatty acid; and about 3% sodium lauryl sulfate.

In another embodiment, the composition excludes caustic soda, optionally comprising rosin wherein the content of rosin in the composition is from greater than 0% to about 30% based upon weight of the fatty acid.

These compositions may be applied in methods of removing ink from a cellulosic containing substance/substrate. In the next section, various embodiments of these applications are discussed.

C. Methods

As stated above, the present invention provides for a method of removing ink from a cellulosic containing substance comprising: (a) adding to the substance a composition comprising: (1) activated magnesium hydroxide, (2) water, (3) optionally a suspending agent for said activated magnesium hydroxide, and (4) optionally an emulsifier; (b) optionally excluding adding caustic soda to the cellulosic containing substance; and (c) optionally excluding adding hydrogen peroxide to the cellulosic containing substance. The present invention also provides for a method of removing ink from a cellulosic containing substance comprising: (a) adding to the substance a composition comprising: (1) magnesium hydroxide, (2) a suspending agent for said magnesium hydroxide, (3) water, and (4) optionally an emulsifier; (b) optionally excluding adding caustic soda to the cellulosic containing substance; and (c) optionally excluding adding hydrogen peroxide to the cellulosic containing substance.

The performance of a deinking process can be measured in a variety of ways. Typically, optical properties such as brightness (B), whiteness (L), red/green color balance (a) and yellow/blue color balance (b*) are measured on a sheet formed from the resulting deinked fiber. In addition to optical properties, an ink speck count measurement is used to evaluate the efficiency with which the ink is removed. Residual ink can be expressed in terms of specks/unit area, percent coverage of ink specks on an area, or effective residual ink concentration (ERIC), which is commonly expressed in ppm.

In one embodiment, the cellulosic substance is located anywhere in a recycling process up through one or more flotation accepts.

In another embodiment, the emulsifier is added separately to the cellulosic containing substance.

In another embodiment, the suspending agent is a thickening agent.

In another embodiment, the thickening agent is selected from the group consisting of: galactomannans; guar gum; locust bean gum; xanthan gum; para gum; cellulosics; hydroxypropyl methylcellulose; hydroxypropyl cellulose; carrageean; alginates; sodium alginates; potassium alginates, ammonium salt alginates; and a combination thereof.

In another embodiment, the composition contains from about 5% to about 70% of said activated magnesium hydroxide/magnesium hydroxide, based upon weight of the composition.

In another embodiment, the composition contains about 47% of said activated magnesium hydroxide/magnesium hydroxide, based upon weight of the composition.

In another embodiment, the composition contains from 0.05% to about 20% of said suspending agent, based upon weight of the composition.

In another embodiment, the composition contains about 0.4% of said suspending agent, based upon weight of the composition.

In another embodiment, the composition further comprises: an oil.

In another embodiment, the composition contains from about 2% to about 55% of said oil based upon the weight of the composition.

In another embodiment, the composition contains about 30% of said oil based upon the weight of the composition.

In another embodiment, the composition contains from about 0.5% to about 20% of said emulsifier.

In another embodiment, the composition contains about 3% of said emulsifier.

In another embodiment, the oil contains a fatty acid.

In another embodiment, the oil is used to form an oil and water emulsion.

In another embodiment, the emulsifier is a surfactant.

In another embodiment, the fatty acid contains a tall oil fatty acid.

In another embodiment, the emulsifier is selected from the group consisting of: sorbitol derivatives; polysorbate 80; sorbitan monolaurate; polysorbate 20; ethoxylated alcohols; sodium laureth sulfate; polyethylene glycol; sulfate esters; sodium lauryl sulfate; and a combination thereof.

In another embodiment, the composition excludes caustic soda.

In another embodiment, the composition further comprises rosin, optionally wherein the content of rosin in the composition is from greater than 0% to about 30% based upon weight of the fatty acid.

In another embodiment, the method of removing ink from a cellulosic containing substance comprises: (a) adding to the substance a composition comprising: (1) activated magnesium hydroxide/magnesium hydroxide, (2) xanthan gum, (3) tall oil fatty acid, (4) sodium lauryl sulfate, and (5) water; (b) optionally excluding the addition of caustic soda to the cellulosic containing substance; and (c) optionally excluding the addition of hydrogen peroxide to the cellulosic containing substance.

In a further embodiment, the composition is comprised of about 47% of said activated magnesium hydroxide/magnesium hydroxide; about 0.395% xanthan gum; about 30% tall oil fatty acid; and about 3% sodium lauryl sulfate.

The methodologies of the present invention can be applied to a paper recycling process, when deinking is desired.

In one embodiment, the composition is added to a paper recycling process in at least one of the following locations: a pulper; dilution stage; flotation cell thickening stage; and a kneader.

In another embodiment, the composition is added in a pulper of a paper recycling process.

In another embodiment, the composition is added at a dilution stage of a paper recycling process.

In another embodiment, the composition is added at a thickening stage of a paper recycling process.

In another embodiment, the composition is added in a flotation cell of a paper recycling process.

In another embodiment, the composition is added in a kneader of a paper recycling process.

In another embodiment, the substance contains one or more paper fibers.

In another embodiment, the paper fibers are secondary fibers in a paper recycling process.

The following examples are not meant to be limiting.

Examples

A formulation for the removal of ink from secondary fiber using under reduced alkalinity conditions can best be realized by thickening a sample of deionized ("DI") water with xanthan gum at 2.0% by weight with gentle stirring. Adding a 50/50 mixture of polysorbate 80 and polysorbate 20 at 2.5% by weight for the combined surfactant to the xanthan gum enables the emulsification of tall oil fatty acid at 5.15% by weight with mixing of the solution. While mixing, magnesium hydroxide particles with 1 micron particle size were added to the emulsion at a concentration of 5.15% by weight. To achieve a stable formulation while maintaining a fluid viscosity capable of being pumped, the overall solids in the formulation were in the range of 15%, but can be increased to higher solids percentages.

For example, 0.4 g of xanthan gum was added to 20 ml of DI water with gentle stirring to assist in dissolving the powder. 0.25 g of polysorbate 20 and 0.25 g of polysorbate 80 were added to the xanthan gum solution. 1.2 g of TOFA was added and emulsified with gentle stirring, along with 1.2 g of magnesium hydroxide, resulting in a stable emulsified slurry of activated magnesium hydroxide and TOFA. The prepared sample was suitable to remove ink from 120 g of secondary fiber.

The deinking treatment can then be added to secondary fiber in the repulping process at a high consistency of fiber and an elevated temperature (~35-60° C.) where the sheets were disintegrated into fiber. To assist in producing a sheet with higher brightness, peroxide was added to the pulper upon the addition of the disclosed formulation. Traditionally, hydrogen peroxide was added to the pulper in caustic deinking at a ratio of 0.6:1 caustic to hydrogen peroxide. Given that when replacing caustic (sodium hydroxide) with magnesium hydroxide, the replacement ratio is 1.0:0.73 NaOH:Mg(OH)$_2$, hydrogen peroxide was added at a ratio of 2.28:1.0 hydrogen peroxide to activated magnesium hydroxide.

Upon complete repulping, the disintegrated secondary fiber was diluted and placed into a floation cell where detached ink was separated from the fiber using an agitator and air bubbles passing from the bottom to the top of the cell, collecting dislodged ink particles. This creates a froth that carries the ink and was removed from the top of the floatation cell. Typical floatation temperatures range from 35-60° C. Upon completion of the floatation stage, the deinked fiber was collected and residual ink and optical measurements are made.

Measurement Methods:

For this study, optical properties of deinked fiber were measured using a Technidyne Colortouch 2 on handsheets prepared according to TAPPI method T218. In the interest of reducing effects of sample preparation, ink speck counts were performed using a PAPRICAN Ink Scanner by Op-Test on the same sheets used for optical characterization.

Sample Results:

As shown in FIG. 1, the residual ink remaining after the deinking process was measured on handsheets made from deinked fiber. The efficacy of the activated magnesium hydroxide and emulsified TOFA formulation is clear when compared to the variations on the formulation and the conventional caustic deinking benchmark.

Figure 2:
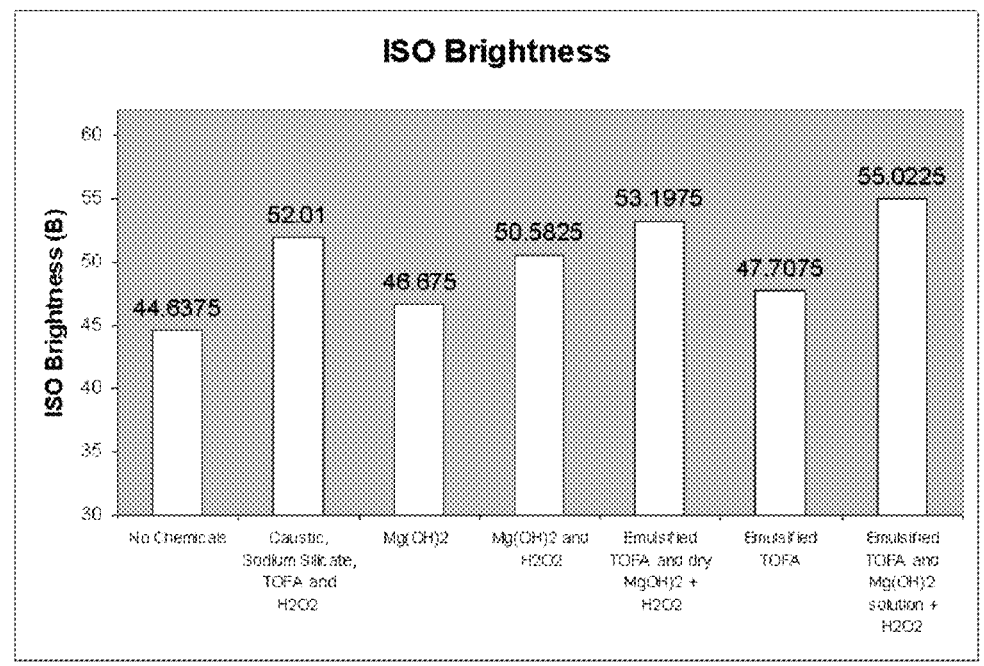
FIG. 2 shows ISO brightness after the application of an activated magnesium hydroxide and emulsified TOFA formulation to fiber.

As shown in FIG. 2, the ISO brightness was measured on handsheets made from deinked fiber. The data shows that the disclosed deinking formulation is capable of outperforming the conventional caustic deinking treatment in brightness gain.

Figure 3:
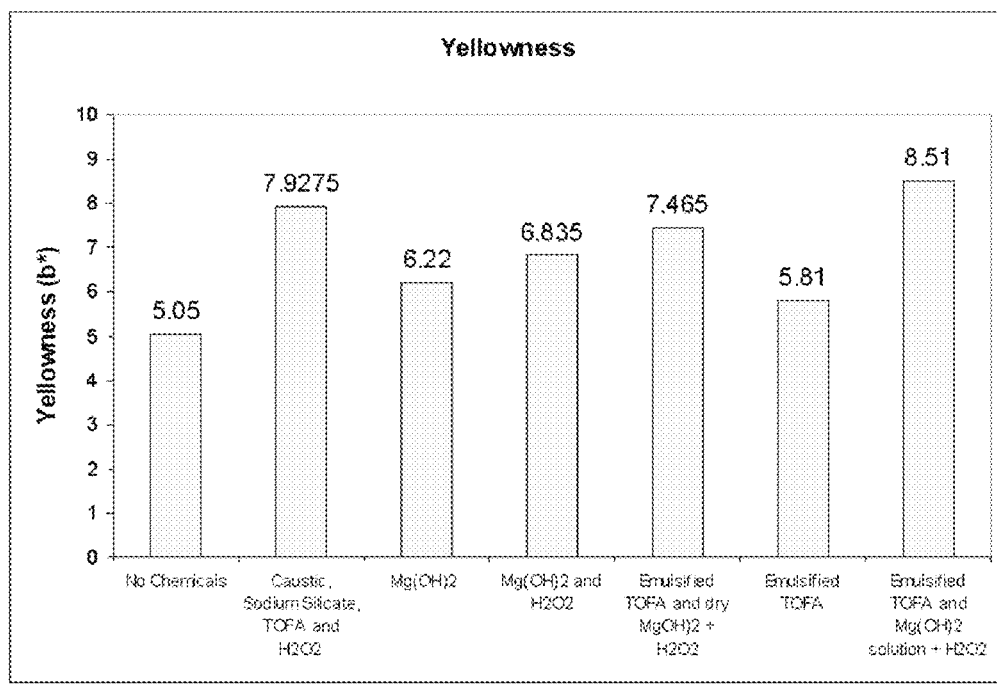
FIG. 3 shows sheet yellowness after the application of an activated magnesium hydroxide and emulsified TOFA formulation to fiber.

As shown in FIG. 3, the sheet yellowness, as measured on handsheets prepared from deinked fiber, is slightly higher for the disclosed formulation, but is not too high to overshadow the benefits of the formulation has for ink removal and the other optical properties.

Figure 4:
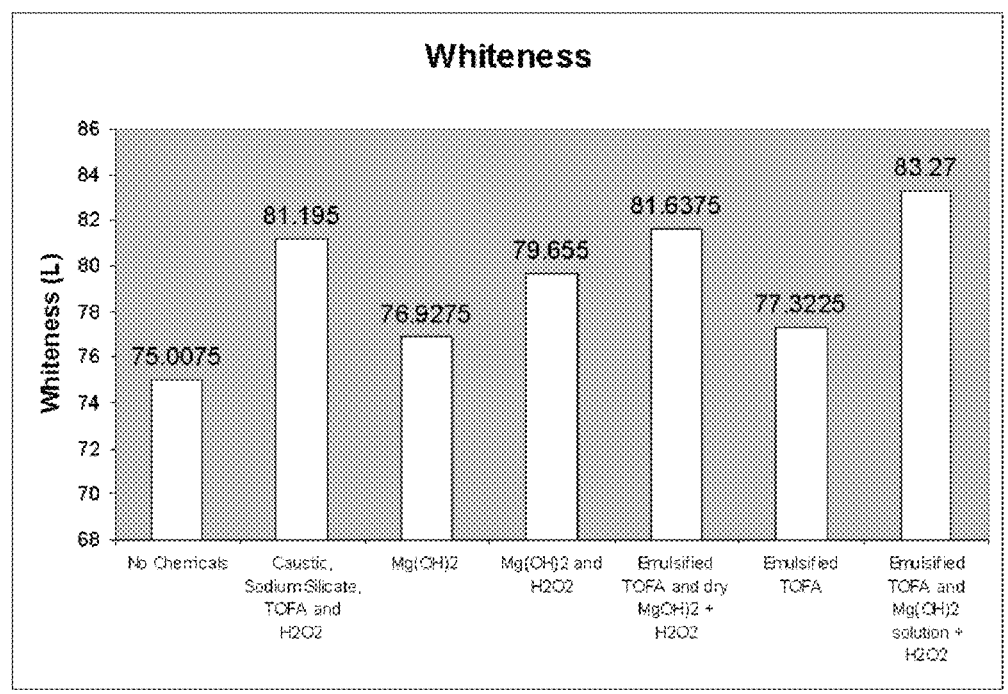
FIG. 4 shows fiber whiteness after the application of an activated magnesium hydroxide and emulsified TOFA formulation to fiber.

As shown in FIG. 4, the fiber whiteness was measured on fiber deinked with the experimental formulations. Similar to the trend observed in the brightness measurements, the proposed invention outperforms the conventional caustic deinking treatment.

We claim:

1. A method of removing ink from a cellulosic containing substance comprising:
    (a) blending a composition comprising: (1) magnesium hydroxide, (2) a suspending agent for said magnesium hydroxide, (3) an emulsifier, (4) water, and (5) tall oil fatty acid;
    wherein the composition contains from about 5% to about 70% by weight magnesium hydroxide;
    (b) adding the composition to the cellulosic containing substance;
    (c) optionally excluding the addition of caustic soda to the cellulosic containing substance; and
    (d) optionally excluding the addition of hydrogen peroxide to the cellulosic containing substance.

2. The method of claim 1, wherein said cellulosic containing substance is located anywhere in a recycling process up through at least one flotation accept.

3. The method of claim 1, wherein the composition is added to a paper recycling process in at least one of the following locations: a pulper; dilution stage; flotation cell thickening stage; and a kneader.

* * * * *